June 19, 1928.
P. O. BROWN
OIL LUBRICATOR
Filed July 12, 1926
1,674,155
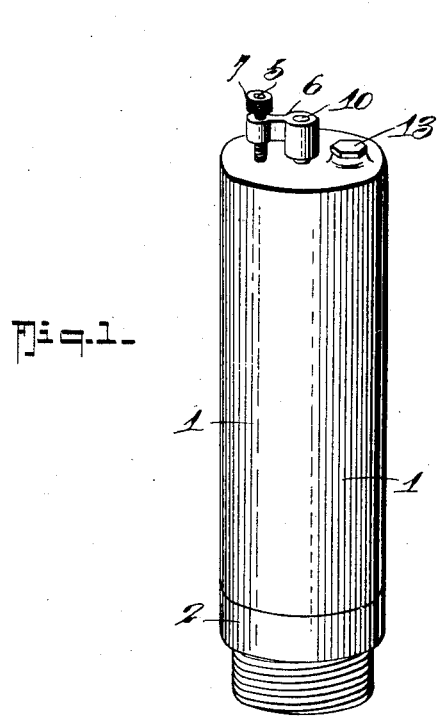
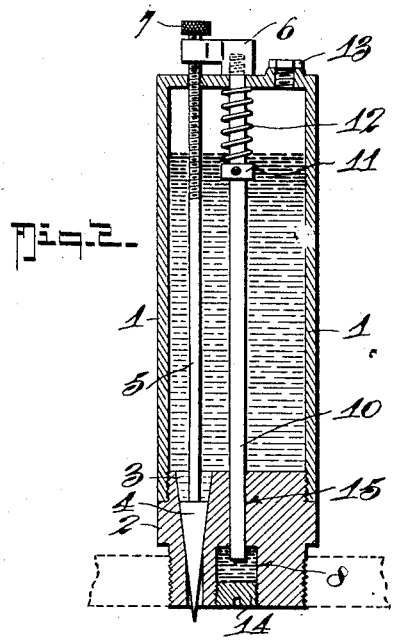
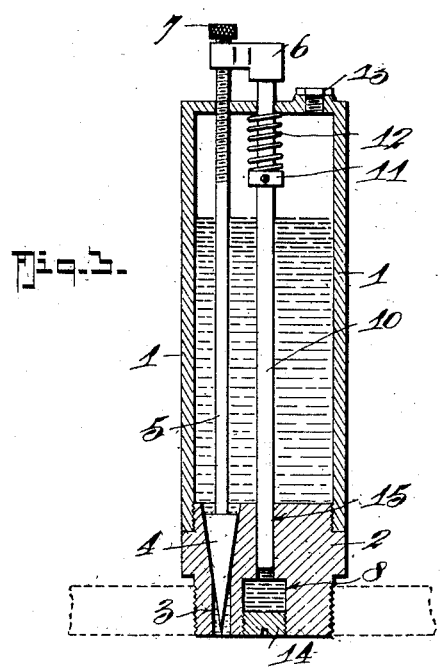
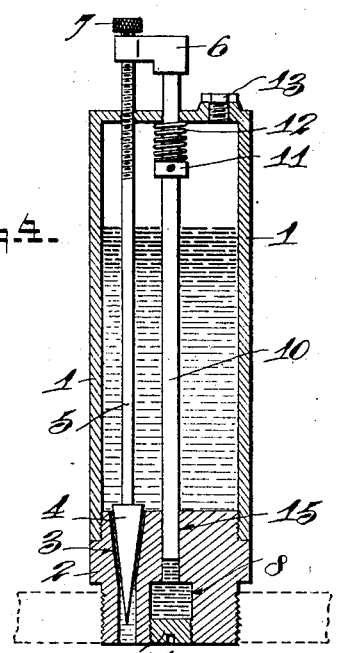
INVENTOR
*Perry O. Brown*
BY
*Albert E. Dietrich*
ATTORNEY Patented June 19, 1928.

1,674,155

UNITED STATES PATENT OFFICE.

PERRY O. BROWN, OF ST. VINCENT, MINNESOTA, ASSIGNOR OF ONE-HALF TO GUSTAF V. BACKSTROM, OF ST. VINCENT, MINNESOTA.

OIL LUBRICATOR.

Application filed July 12, 1926. Serial No. 121,974.

My invention relates to that kind of oil lubricator which has an emergency provision for varying the feed of oil to a part to be lubricated, accordingly as the temperature of said part rises and falls above normal. In lubricators of this type, (see my Patent No. 1,567,702 issued December 29, 1925 for example) means are provided to effect a regular or normal feed of lubricant under ordinary or normal conditions, and to increase that feed during a rise in temperature of the bearing or other part being lubricated, and again restore the feed to normal when the temperature has fallen to normal.

The present invention has for its objects greatly to simplify and reduce the cost of construction of lubricators of this general type; to provide means whereby a regular feed adjusting device is so controlled by an emergency control device that not only will the regular feed be automatically increased above normal and restored again to normal upon rise and fall respectively of the temperature of the part to be lubricated, but it will result in automatically closing off of the regular feed when the parts to be lubricated are at rest and the temperature thereof falls below the normal running temperature, said means also serving to restore the regular feed when the parts to receive lubrication warm up to normal running temperature again.

Another object is to provide means to keep up the proper flow of lubricant by preventing or releasing the clogging of the oil feed-out duct or passage, which might otherwise interfere with the proper flow of lubricant.

A still further object of the invention is to provide a positive mechanical connection between the regular or normal feed control valve and the emergency control device whereby the action of the emergency control device will directly effect the valve action (during emergency operation) and not effect it through the variation of pressure in the lubricant itself as is done in my patented device hereinbefore referred to; this insures the proper functioning of the control valve, according to the desired flow of lubricant, at all times.

With other objects in view which will be apparent to those skilled in the art invention also resides in those novel features of construction, combination and arrangement of parts, all of which will be first fully described, then be specifically pointed out in the appended claim, reference being had to the accompanying drawing in which:—

Figure 1 is a perspective view of my invention.

Figure 2 is a vertical longitudinal section of the same, showing the parts positioned in the non-operating or rest condition.

Figure 3 is a view similar to Figure 2, showing the position of parts during the normal operation.

Figure 4 is a view similar to Figure 3 showing the position of parts when the bearings have heated up and an emergency adjustment has been effected.

In the drawing in which like numerals of reference designate like parts in all the figures, 1 represents the casing body or oil reservoir which, in the preferred embodiment, consists of a tube whose top is closed and whose bottom threads onto a threaded portion of a base 2, the top part of the base 2 being screwed into the open end of the tube.

The lower end of the base 2 is threaded so that it can be screwed into a screw-threaded hole in a journal box or other apparatus to which it is desired to feed lubricant, thereby enabling the lubricating device to be attached to its place of service to running machinery in a convenient and expeditious way.

The base 2 is provided with a small opening or passage 3 for delivering the lubricant from the interior of the reservoir to the part to be lubricated; this opening is of circular form and has a part of frusto-conical shape with its larger base at the top to cooperate with a needle valve 4 that has a conical portion to cooperate with the conical part of the passage 3 as clearly shown in the drawing. It is by the adjustment of this valve 4 that the flow of lubricant from the reservoir to the part to be lubricated is suitably controlled while the lubricator is in use.

Extending upwardly from the needle valve 4 is a rod 5 that passes through the reservoir top and is suitably threaded to pass through a screw-threaded hole in a supporting arm 6. A suitable finger piece 7 is secured to the upper end of the rod 5 by which the rod may be turned in the arm 6 to effect the normal adjustment of the needle valve.

The base 2 is provided with a small bore 8, the bottom of which is plugged as at 14, and this bore 8 contains mercury or other suitable expansible liquid. The base 2 is furthermore bored, as at 15, to form a bearing for the rod 10 of the emergency control device, the rod 10 projecting into the bore or chamber 8 as indicated.

Near the upper end the rod 10 is provided with a collar 11 between which and the top of the reservoir is located a spring 12 that is mounted on the rod 10. The rod 10 is threaded at its upper end into the arm 6 to make a rigid connection therewith, the arm 6 serving as a downward stop to limit the downward movement of the rod 10 as well as the closing movement of the valve 4.

The top of the reservoir is provided with an opening that contains a screw cap 13 through which opening (when the cap is removed) the reservoir may be charged with lubricant.

In operation, when the device has been applied to a bearing or other part to be lubricated and the machinery is running so as to warm up to its normal temperature, the valve 4 is set, by turning the finger piece 7, to feed the desired normal quantity of lubricant. When the parts are running under the normal temperature of course the rod 10 will be slightly lifted due to the expansion of the mercury or other expansible fluid in the chamber 8, and the arm 6 will be raised from its contact with the top of the reservoir. Now should the temperature of the part to be lubricated rise above the normal (as would be the case were the bearing getting insufficient lubricant or overheating for any other reason) the heat will be communicated to the base 2 and cause a further expansion of the fluid within the chamber 8, thereby raising the rod 10 and by virtue of the direct connection afforded by the arm 6 the rod 5 will be raised a corresponding degree to unseat the valve 4 to a correspondingly greater extent and permit more lubricant to flow through the passage 3. As soon as sufficient lubricant has passed to supply the bearing with the desired lubrication and the temperature of the parts again falls to normal the contraction of the fluid in the chamber 8 will permit the rod 10 to be lowered under the action of the spring 12 and consequently the valve 4 will be brought again to its normal position to effect the normal feed.

When the machinery stops running and the parts require no further lubrication the temperature of course will fall below the normal running temperature and permit the rod 10 to move until the arm 6 rests on the top of the reservoir or until the valve 4 shall have become seated and thus cut off the flow of lubricant until the bearing or other part to be lubricated again warms up to its normal running temperature.

The needle valve 4 should be long enough to extend entirely through the passage 3 when the adjustment is closed and nearly through the passage when the valve is open to its normal adjustment, it being one of the purposes of the needle valve to facilitate the work of keeping the passage 3 open to the flow of lubricant.

The screw threads on the upper end of the rod 5 should extend far enough down on that rod to enable the valve 4 to be raised entirely above the top part of the base 2, as the said needle valve must be in such raised position before the container 1 can be assembled with the base 2.

The regular adjustment of the lubricator should be made at the normal temperature of its place of attachment on the operating machine; and when the machine has stopped running and its temperature lowered the flow of lubricant will be automatically stopped by the emergency control device above described. When the machine is again started or set into motion the normal adjustment will be re-established in response to the change of temperature from sub-normal to normal running temperature.

From the foregoing it will be seen that when the regular adjustment of the lubricator fails to provide a sufficient amount of lubricant to the need of the operating machine, or when the flow of lubricant is restrained or shut off by dirt or other foreign matter, choking the passageway 3, the rise of temperature produced by friction of parts in the journal boxes, etc. will expand the fluid in the chamber 8, drive up the rod 10, raise the needle valve 4 above its adjusted position, and thus make possible the flow of the lubricant through the passage 3 directly into the affected parts of the operating machine; when friction ceases, the temperature drops, the fluid in chamber 8 contracts and the rod 10 lowers, thus permitting the needle valve 4 to reassume its position of regular adjustment.

From the foregoing description, taken in connection with the accompanying drawing, it is thought the complete construction, operation and advantages of my invention will be clear to those skilled in the art to which it relates.

What I claim is:

In oil lubricators, a base having a threaded end to enter the part to be lubricated, said base having its other end threaded, said base having two longitudinal passageways, one of which has a coni-form portion constituting a valve seat, the other of said passageways being counterbored to form a chamber, a plug closing the lower end of said chamber, expansible fluid trapped in said chamber, a rod operating in the passage having the counterbore, a tubular body closed at one end and having its other end threaded onto said plug, said rod extending upwardly through said tubular body and through an aperture in the upper end of said tubular body to the outside thereof, a collar on said rod within the tubular body, a spring on said rod between the top of the tubular body and the collar, a needle valve associated with and cooperating with said valve seat-passage, a valve stem projecting upwardly from said needle valve through an aperture in the upper end of said tubular body, an arm secured to the upper end of said rod into which arm said valve stem is threaded for adjustment purposes, said needle valve being pointed and of a length sufficient to project entirely through said passage when the valve is seated, said expansible fluid cooperating with the rod in said passage having the counterbore, to actuate said valve according to temperature changes, all being arranged substantially as shown and for the purposes described.

PERRY O. BROWN.